United States Patent
Zadikian et al.

(10) Patent No.: US 7,349,326 B1
(45) Date of Patent: Mar. 25, 2008

(54) CONTROL OF INTER-ZONE/INTRA-ZONE RECOVERY USING IN-BAND COMMUNICATIONS

(75) Inventors: Haig Michael Zadikian, McKinney, TX (US); Zareh Baghdasarian, La Canada, CA (US); Ali Najib Saleh, Ft. Lauderdale, FL (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 877 days.

(21) Appl. No.: 10/039,989

(22) Filed: Oct. 26, 2001

Related U.S. Application Data

(63) Continuation-in-part of application No. 09/899,962, filed on Jul. 6, 2001.

(51) Int. Cl.
*H04J 1/16* (2006.01)
(52) U.S. Cl. ...................... 370/216; 370/242
(58) Field of Classification Search ........ 370/216–228, 370/236.1–236.2, 237–395.1, 400
See application file for complete search history.

(56) References Cited

U.S. PATENT DOCUMENTS

| | | | | |
|---|---|---|---|---|
| 4,993,015 | A | * | 2/1991 | Fite, Jr. ...................... 370/218 |
| 5,444,693 | A | | 8/1995 | Arslan et al. ................ 370/221 |
| 5,832,197 | A | | 11/1998 | Houji .............................. 714/4 |
| 6,026,077 | A | | 2/2000 | Iwata ........................... 370/254 |
| 6,167,025 | A | | 12/2000 | Hsing et al. ................. 370/216 |
| 6,392,989 | B1 | | 5/2002 | Jardetzky et al. ........... 370/216 |
| 6,697,325 | B1 | | 2/2004 | Cain ........................... 370/217 |
| 6,760,777 | B1 | | 7/2004 | Agarwal et al. ............ 709/238 |
| 6,832,258 | B1 | | 12/2004 | Oman ......................... 709/229 |
| 2002/0131362 | A1 | | 9/2002 | Callon ........................ 370/216 |
| 2002/0141378 | A1 | | 10/2002 | Bays et al. .................. 370/351 |

\* cited by examiner

*Primary Examiner*—Brenda Pham
(74) *Attorney, Agent, or Firm*—Campbell Stephenson LLP

(57) ABSTRACT

A method of communicating information regarding a failure is disclosed. The method includes generating failure information. The failure affects a virtual path, which is between a first node and a second node. A first zone includes the first node, and a second zone includes the second node. The failure information can include, for example, a zone identifier and/or an action code.

230 Claims, 8 Drawing Sheets

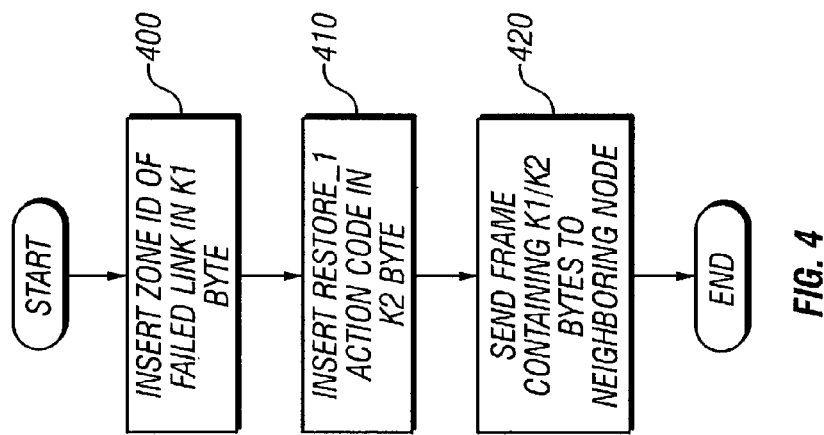
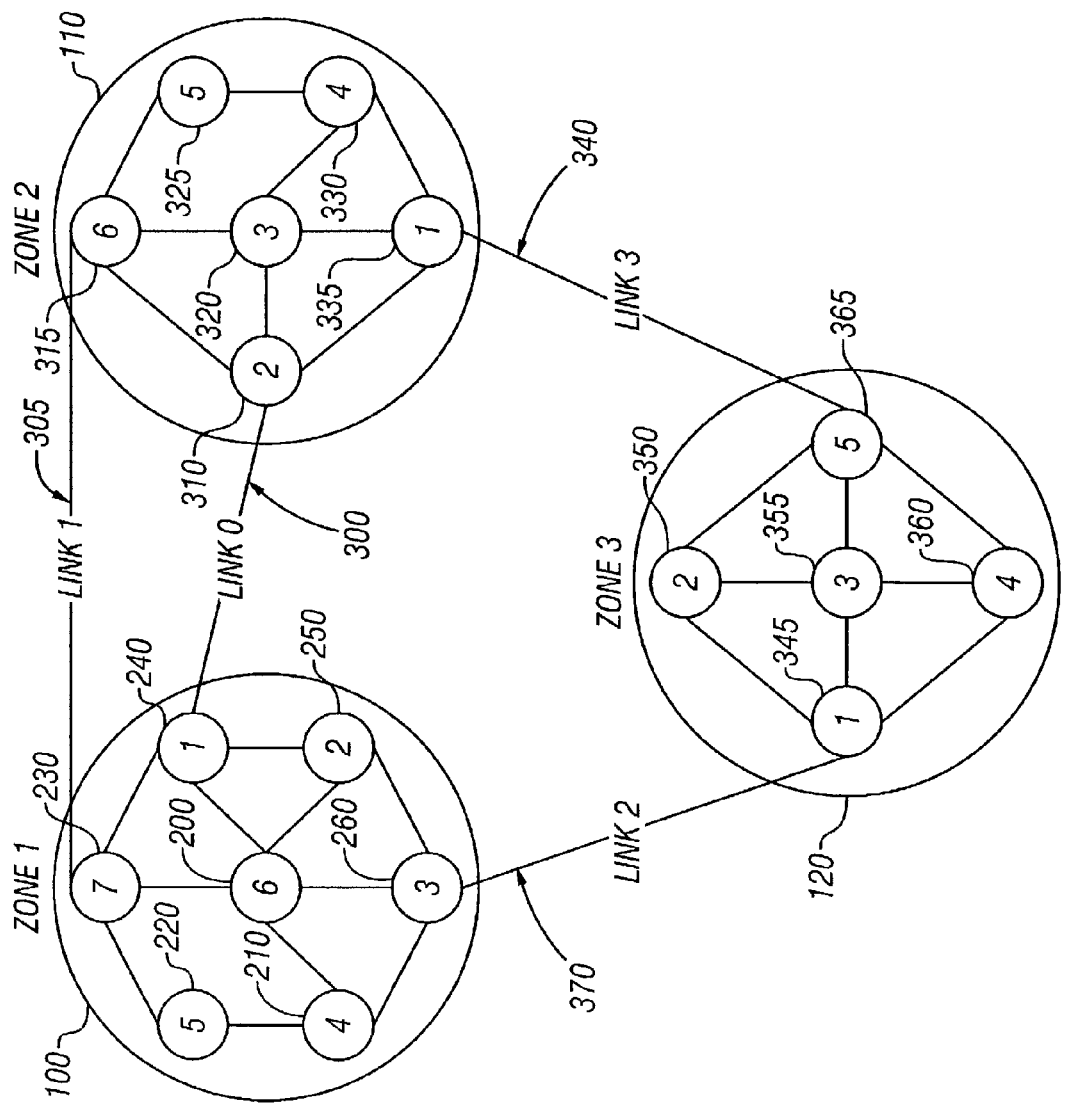
FIG. 4
FIG. 3

CONTROL OF INTER-ZONE/INTRA-ZONE RECOVERY USING IN-BAND COMMUNICATIONS

CROSS-REFERENCES TO RELATED APPLICATIONS

This application is a continuation-in-part patent application Ser. No. 09/899,962, entitled "METHOD AND APPARATUS FOR INTER-ZONE RESTORATION," filed Jul. 6, 2001, having H. M. Zadikian, Z. Baghdasarian, A. N. Saleh and V. Parsi as inventors, and which is assigned to Cisco Technology, Inc., the assignee of the present invention, and which is hereby incorporated by reference herein, in its entirety and for all purposes.

BACKGROUND OF THE INVENTION

1. Field of the Invention

This invention relates to the field of communication networks, in particular to a method and apparatus to re-establish communication links after one or more communication links experience a failure.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of light wave communications carried over fiber-optic cables. The use of light wave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g., 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. The restoration of a circuit following a failure in a mesh topology can consume a relatively large amount of time.

Therefore, there is the tradeoff in ring topologies that can restore communication quickly but take up a great deal of bandwidth, and mesh topologies that do not take up as much bandwidth but are much slower in restoring communications. Current communication networks provide continuous, and as users have become accustomed to, uninterrupted transmission. A need therefore has been felt for a method and apparatus that allows for rapid restoration of communication in the event of the failure of a link, and communication of information regarding same.

SUMMARY OF THE INVENTION

In one embodiment, a method of communicating information regarding a failure is disclosed. The method includes generating failure information. The failure affects a virtual path, which is between a first node and a second node. A first zone includes the first node, and a second zone includes the second node. The failure information can include, for example, a zone identifier and/or an action code.

In another embodiment, a method of communicating information regarding a failure is disclosed. The method includes receiving failure information at a node. The failure affects a virtual path, which is between a first node and a second node. A first zone includes the first node, and a second zone includes the second node. The failure information can include, for example, a zone identifier and/or an action code.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

FIG. 3 illustrates inter-zone communication.

FIG. 4 is a flow diagram illustrating the actions performed in generating inter-zone failure information that is communicated using in-band techniques.

Figure 1:
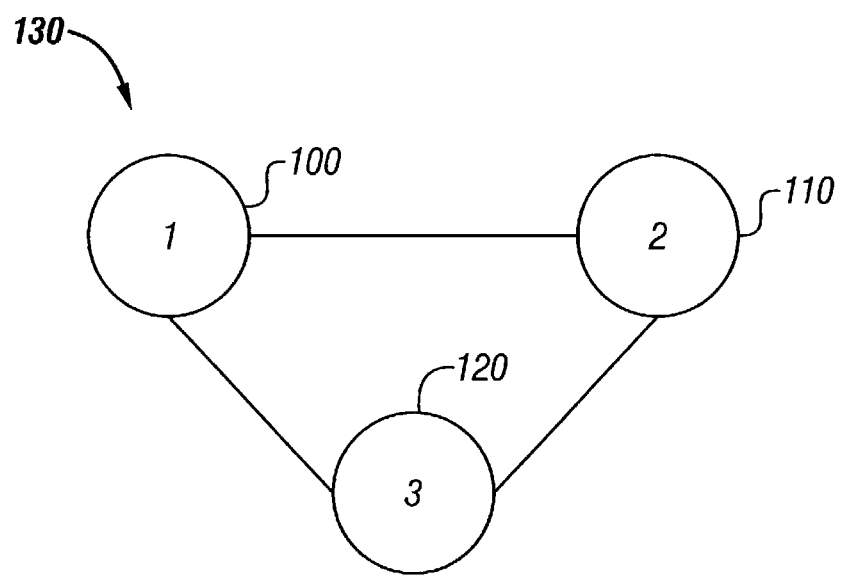
FIG. 1 illustrates a backbone zone.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the scope of the present invention as defined by the appended claims.

DETAILED DESCRIPTION

An Example Zoned Network Architecture

The present invention provides for the communication of information for regarding the restoration of paths between zones, each of which may include one or more nodes. A detailed description of a zoned network architecture such as that now presented is described in the commonly assigned patent application Ser. No. 09/389,302, filed Sep. 2, 1999, entitled, "A NETWORK ADDRESSING SCHEME FOR REDUCING PROTOCOL OVERHEAD IN AN OPTICAL NETWORK" and having A. N. Saleh and S. E. Plote as inventors, which is hereby incorporated by reference herein, in its entirety and for all purposes.

A given path's source and destination nodes will be located within one or more zones. In the case contemplated by the present invention, the source and destination nodes are located in different zones, and so the path's operation necessarily implicate inter-zone communications. At each of the zones, certain nodes are coupled to nodes in other zones. Such nodes are referred to herein as border nodes, and so, border nodes of a given zone are coupled to one or more border nodes of other zones, as well as nodes within that zone. The aggregation of zone interconnections are referred to herein as a backbone zone.

A topology database can be used to provide information to nodes in a network regarding connectivity of those nodes to other of those nodes and zones. Broadcast packets are sent by nodes whenever a failure occurs, effectively requesting the availability of other nodes to connect and establish a communication path. To limit the size of the topology database and the scope of broadcast packets, networks employing the protocol described herein can be divided into smaller logical groups called "zones." Each zone executes a separate copy of the topology distribution algorithm, and typically nodes within each zone are only required to maintain information about their own zone. There is no need for a zone's topology to be known outside that zone's boundaries, and nodes within a zone need not be aware of the network's topology external to their respective zones. A network includes a number of nodes.

Nodes that attach to multiple zones are referred to herein as border nodes. Each zone has at least one border node, and that border node is coupled to at least one other border node of another zone. Border nodes are typically required to maintain a separate topological database, also called link-state or connectivity database, for each of the zones to which they are attached. Border nodes use the connectivity database for intra-zone routing. Border nodes are also required to maintain a separate database that describes the connectivity of the zones themselves. This database, which is referred to herein as the network database, is used for inter-zone routing. The network database describes the topology of a special zone, referred to herein as the backbone zone. In certain embodiments, the backbone zone is always assigned a hierarchical identification (ID) of 0. The backbone has the characteristics of a zone. There is no need for a backbone's topology to be known outside the backbone, and a zone's border nodes need not be aware of the topologies of other zones.

FIG. 1 is a block diagram illustrating a topology of a backbone zone. A zone 100 (also referred to as Zone 1) directly connects to a zone 110 (Zone 2). A zone 120 (Zone 3) is connected to zone 100 (Zone 1) and zone 110 (Zone 2). Zone 120 (Zone 3) indirectly connects zone 100 (Zone 1) and zone 2 (Zone 110). In this particular example, the backbone zone 130 is referred to as Zone 0.

Figure 2:
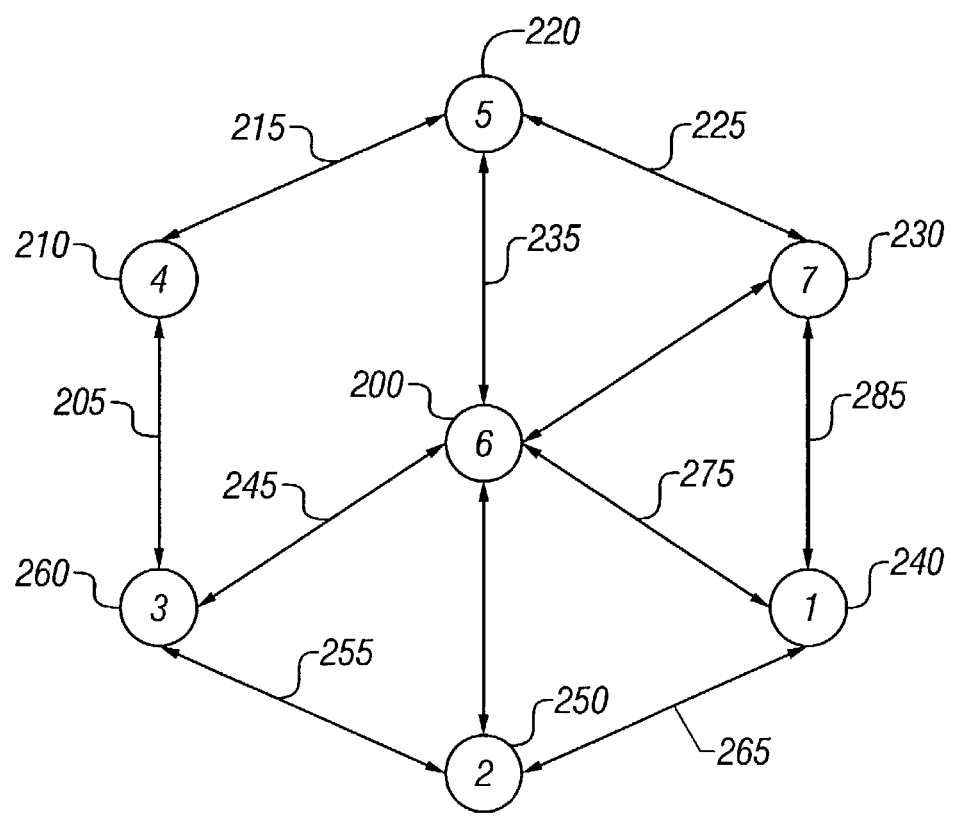
FIG. 2 illustrates a nodal zone of a backbone zone.

FIG. 2 is a block diagram illustrating a topology of a zone of a backbone zone. Zone 1 includes a number of nodes and links. In this particular example, "Zone 1" includes a node 240 (Node 1); a node 250 (Node 2); a node 260 (Node 3); a node 210 (Node 4); a node 220 (node 5); a node 200 (Node 6); and a node 230 (Node 7). Links interconnect the nodes, and in this particular example, the topology includes a link 205, a link 215, a link 225, a link 235, a link 245, a link 255, a link 265, a link 275, and a link 285. In an embodiment, a link can be define as a logical group of one or more ports that connect two adjacent nodes (e.g., a physical interface). A port is a physical interface. There can be more than one link between adjacent nodes.

Within a zone, nodes can be distinguished by the attributes they possess. In one embodiment, the location of the node can determine the attributes of the node. A master node is defined as the endpoint of a link with numerically lower node ID. A master border node is defined as the end-node of an inter-zone link that is also a source node or proxy source node of one or more virtual paths (VP) that use that inter-zone link. A proxy node is a node that can be a proxy for (stand in for) a source (or destination) node, acting for that node (e.g., in the case of restoring a failed VP). Typically, a proxy node will be a border node (a node that is coupled to one or more nodes in another zone), and, although a border node need not necessarily act as a proxy node, such is typically the case. Thus, proxy nodes are also referred to herein as border proxy nodes. A VP is an end-to-end connection with which is associated certain information such as a path bandwidth, class of service (CoS), quality of service (QoS) level, and the like. An inter-zone VP is one that traverses two or more zones.

The wavelength routing protocol (also referred to herein as WaRP™) describes a master border node as generating a Create Path request when the inter-zone link fails. For a description of WaRP™, please refer to the commonly assigned patent application Ser. No. 09/232,397, filed Jan. 15, 1999, entitled, "A METHOD FOR ROUTING INFORMATION OVER A NETWORK" and having H. M. Zadikian, Z. Baghdasarian, A. N. Saleh and V. Parsi as inventors, which is hereby incorporated by reference herein, in its entirety and for all purposes. A slave border node is the end-node of an inter-zone link that is also the destination or proxy destination node of one or more VPs that use that link. An entry border node is a border node that receives the Create Path request from an adjacent zone. An exit border node is a border node that forwards the Create Path request to an adjacent zone. An origin node is the origin of a WaRP™ packet (e.g. Restore Path, Delete Path, and Test Path packets). An origin node is either the source node of the VP or a proxy border node. In the case of an intra-zone failure, an origin border node is a border node that assumes the role of a source node during a path restoration attempt, and is responsible for generating the Restore Path request on behalf of the source node. The ID of the origin border node is carried in the origin field of the Request Path request.

FIG. 3 illustrates a topology of inter-zone communication. Zone 100 (Zone 1) 100 is connected to zone 110 (Zone 2) by a link 300 (Link 0). The border node 240 (Node 1) of zone 100 (Zone 1) is connected by link 300 (Link 0) to border node 310 (Node 2) of zone 110 (Zone 2). The following naming convention will henceforth be used to describe a node. The naming convention consists of the zone, followed by a period, and the node that is referred to within the specific zone. Therefore, node 240 (Node 1) of zone 100 (Zone 1) can also be referred to as Node 1.1. Node 310 (Node 2) of zone 110 (Zone 2) can also be referred to as Node 2.2.

In this particular example, inter-zone link "Link 0" 300 fails. When an inter-zone link fails, or one of its two end nodes fail, the WaRP™ protocol uses a combination of broadcast and source-routed packets to reroute traffic around the failure.

In certain implementations, the WaRP™ protocol allows a single inter-zone failure to be restored within 50 milliseconds (ms) or less. In one embodiment, timely restoration (within 50 ms) during a second inter-zone failure can be affected by the WaRP™ protocol algorithm using information contained in the topology database of the backbone zone, or in this example Zone 0, to compute new inter-zone routes for the failed VPs. Source routed packets are used to request and establish the new routes. In other words, no flooding or broadcasting of packets is ever attempted nor allowed between zones, only within zones or intra-zone. One of the two nodes on either end of the failed link that node being a master node computes a shortest path first alternative for each failed route, and places the newly calculated routes into a Create Path packet, and sends the Create Path packet to the next backbone node along the path. Tandem border nodes then use the computed route to forward the packet toward its ultimate destination. Routes within each zone are established using the same flooding mechanism as described earlier. The basic flooding mechanism involves each packet being sent to all active neighbors except the one from which the packet was received.

Intra-zone restoration activities preferably occur in parallel and proceed independently of one another. While routes are established, a second failure along an inter-zone link results in a negative response generated by one of the tandem border nodes. That negative response is propagated all the way to the master border node, and causes the master border node to compute a new route for the VP and retry the operation or link. In most cases, this process increases the restoration time of the VP to over 100 ms (or the time required for 2 attempts). This lengthy restoration time can be avoided, and restoration times limited to 50 ms or less by pre-planning the backbone route for all inter-zone link failures. Only the backbone route, the backbone route being made up entirely of inter-zone links, needs to be pre-planned. The one or more intra-zone sub-paths of the end-to-end route are still established dynamically using the Restore Path packet/request.

Restoration times can also be limited by eliminating any possibility of back-to-back inter-zone link failures. One way to deal with inter-zone link failures is to use traditional protection schemes like diverse routing (the use of physically dissimilar cabling and hardware) and self-healing rings (SHR). This is also known as providing redundant paths. Protecting inter-zone links can be justified because inter-zone links make up a very small percentage of the overall fiber capacity. Moreover, in some situations, there is not enough connectivity among zones to make mesh restoration in the backbone zone any more efficient than diverse routing and SHR.

One of the attributes that makes mesh restoration superior to other traditional schemes is mesh restoration's ability to allow for sharing capacity. The amount of capacity sharing, however, is highly dependent on the topology of the network, the richness of its connectivity, and the end-to-end demand requirements. For a sparsely connected network, such as may be the case in a backbone zone, capacity sharing is minimal. For such topologies, where connectivity is limited and a hop-count is small, the additional cost of using traditional restoration methods can be justified (a hop is the path between two network nodes, and the hop-count is the number of hops between a given pair of nodes. For example, a "two hop" route involves three nodes and two links a two links.

SHR provides very fast restoration of failed links by using redundant links between the nodes of each ring. Each ring consists of two rings, a ring supporting information transfer in a "clockwise" direction and a ring supporting information transfer in a "counter-clockwise" direction. The terms "east" and "west" are also commonly used in this regard. Each direction employs its own set of fiber optic cables, with traffic between nodes assigned a certain direction (either clockwise or counter clockwise). If a cable in one of these sub-rings is damaged, the ring "heals" itself by changing the direction of information flow from the direction taken by the information transferred over the failed link to the sub-ring having information flow in the opposite direction.

The detection of such faults and the restoration of information flow thus occur very quickly, on the order of 10 ms for detection, and 50 ms for restoration for most ring implementations. The short restoration time is critical in supporting applications, such as telephone networks, that are sensitive to QoS. Other applications that may be QoS sensitive include systems that require short restoration times to prevent old digital terminals and switches from generating and initiating alarms, such as carrier group alarms. Alarms are undesirable because such alarms usually result in dropped calls, causing users down time and aggravation.

The protection bandwidth can be a user-configurable parameter, attaching a QoS metric to configured connections and links. The QoS parameter allows the amount of required spare capacity to be reduced even further, while maintaining the same quality of service for those connections that need it and, more importantly, can afford such treatment. In other words, high availability is mapped into a cost metric and only made available to users who can justify the cost.

It will be noted that, typically, restoration times that exceed 10 seconds can lead to timeouts at higher protocol layers, while those that exceed one minute can lead to disastrous results for the entire network. However, the price of such quickly-restored information flow is the high bandwidth requirements of such systems. By maintaining completely redundant sub-rings, an SHR topology requires 100% excess bandwidth. As noted, an alternative to the SHR topology is the mesh topology.

Networks based on mesh-type restoration are inherently more capacity-efficient than ring-based designs, mainly because each network link can potentially provide protection for fiber cuts on several different links. By sharing the capacity between links, a network using a mesh topology can provide redundancy for failure restoration at less than 100% of the bandwidth capacity originally required. Such networks are even more efficient when traffic transits several links. Using the described approaches, however, result in restoration times ranging from several minutes to several months.

Once the user has defined the topology of the network, the user can configure one or more connections between nodes. Each configured connection defines a virtual path between the two end points, which are not required to be direct neighbors or even belong to the same zone. Similar to a physical point-to-point connection, the resulting VP has an associated capacity and an operational state.

The two end points of a VP can be designated as having a master/slave relationship. The master node is also referred to herein as the source node of the VP, and the slave node is referred to herein as the destination node. The source node typically assumes recovery responsibilities for the VP and originates Restore Path requests. The destination node waits for a message from the source node informing the destination node of the new path to use for the connection.

The method in which VPs are restored is the same regardless of how backbone routes are obtained. If 1:1 protection is used in the backbone zone, the alternate route is simply the protection channel assigned to the failed span. For a description of 1:1 and 1:N protection, please refer to the commonly assigned patent application Ser. No. 09/859,166, filed May 16, 2001, entitled, "A METHOD FOR RESTORING A VIRTUAL PATH IN AN OPTICAL NETWORK USING 1:N PROTECTION" and having H. M. Zadikian, Z. Baghdasarian, A. N. Saleh and V. Parsi as inventors, which is hereby incorporated by reference herein, in its entirety and for all purposes.

When mesh restoration is used, however, the route is computed automatically by running an shortest path first (SPF) algorithm on the backbone zone to find the shortest path between the two border nodes. The alternate route, regardless of how it is computed, is then placed in the Create Path request and sent to the target node.

Shortest Path First (SPF) Algorithm

Routes can be computed using a QoS-based shortest-path algorithm or the SPF algorithm. The route selection process relies on configured metrics and an up-to-date view of the topology to find the shortest paths between any two nodes. The topology database contains information about all network nodes, their links, and available capacity.

All nodes are assigned globally unique IDs. This gives the user control over the master/slave relationship between nodes. The network detects duplicate IDs when node adjacency is established. All nodes found with a duplicate ID are disabled by the protocol. An appropriate alarm can be generated to provide notification of the problem so that proper action can be taken.

The details of an example SPF algorithm are provided in patent application Ser. No. 09/232,397, entitled "A METHOD FOR ROUTING INFORMATION OVER A NETWORK," as previously incorporated by reference herein.

Restoration of Inter-Zone Failures

Communications are carried out, in the event of an inter-zone failure, to restore VPs affected by the failure. For example, a Create Path packet can be used to restore VPs disabled by such inter-zone failures. The Create Path packet can carry, among other information carried in its body, a route that consists of a list of border nodes along the path between the source and destination nodes of the given VP. The Create Path packet is generated by one of the two border nodes that share the failed link (or the remaining one of the border nodes that remains operational, in the case of a failed border node). The Create Path packet is terminated by the border node of the last zone that the old and new paths have in common.

Now referring back to FIG. 3, the two end-points of the failed inter-zone link, which are border nodes "Node 1.1" 240 and "Node 2.2" 310, detect the failure on "Link 0" 300 and send one or more Link Down indications to all end-nodes affected by the failure. An end-node is any node that terminates a VP within that zone, including proxy source and destination nodes. In this example, the two end nodes are "Node 1.6" 200 and "Node 2.3" 320.

"Node 2.2" 310, a master border node realizes that the failed link has a pre-planned alternate path, so it formats the following Create Path request of Table 4 and sends it to "Node 2.6" 315:

TABLE 4

| Field | Contents |
|---|---|
| Origin | 2.2 |
| Target | 2.6 |
| VPID | 0x20060001 |
| PathIndex | 0 |
| Path | 2.6, 1.7 |

When the Create Path request arrives at node "Node 2.6" 315, it simply increments the PathIndex field and forwards the modified request to "Node 1.7" 230, the next node along the path. The Create Path request also initiates path establishment within its zone by sending a Restore Path request to node 2.3, the Destination node of the VP.

Failure Restoration

Once a node has detected a failure on one of its links, either through a local loss of signal (LOS) defect or a received alarm indication signal (AIS), the node scans its VP table looking for entries that have the failed link in their path. When the node finds such an entry, the node releases all link bandwidth used by the VP. Then, if the node is the VP's source node, or a proxy border node, the node changes its state to "restoring" and places the affected VP on a list of VPs to be restored. Otherwise, if the node is not the source node or a proxy border node, the state of the VP is changed to "down," and a timer is started to delete the node from the database. If a corresponding Restore Path request is not received from the origin node within a certain timeout period, the timer is started.

The VP list that was created in the previous step is rank-ordered by QoS, ensuring that VPs with a higher QoS are restored first. Each entry in the list contains, among other things, the ID of the VP, Source and Destination nodes of the VP, configured QoS level, and required bandwidth.

When the Create Path request arrives at node 230 (Node 1.7), the last node in the specified path, Node 1.7 sends a Change Target request to node 200 (Node 1.6), node 200 (Node 1.6) being the source node of the VP. "Node 1.7" 230 does not forward the Create Path request since there are no other entries in the path. Upon receiving the Change Target request from node 230 (Node 1.7), node 200 (Node 1.6) formats and sends a Restore Path request to node 230 (Node 1.7).

Once an acceptable instance of the Restore Path request has reached node 230 (Node 1.7) 230, node 230 (Node 1.7) sends a Create Path response to node 315 (Node 2.6). The response, as illustrated in Table 5, contains a list of ports allocated for the VP on the inter-zone link. In this example, node 230 (Node 1.7) allocates port 4 and port 6.

TABLE 5

| Field | Contents |
|---|---|
| Origin | 1.7 |
| Target | 2.6 |
| VPID | 0x20060001 |
| PathIndex | 0 |

TABLE 5-continued

| Field | Contents |
|---|---|
| Path | 2.6, 1.7 |
| Ports | 4, 6 |

When the positive response reaches node 315 (Node 2.6), the sub-path in "Zone 2" 110 connects to the ports specified in the response. Node 315 (Node 2.6) then forwards the response to Node 310 (Node 2.2). Node 310 (Node 2.2) is the master border node that generated the Create Path request.

Two Hop Inter-Zone Alternate Path

In this example, the preplanned alternate path passes through a transit zone. The transit zone 120 is also referred to as Zone 3. A transit zone is defined as a zone that contains one or more tandem nodes used by a particular VP, with the transit node neither originating nor terminating that VP. The first two steps are the same as described in the previous example, except for the path shown in the Create Path message. The alternate path in this example is:

Node 335(Node 2.1)→Node 365(Node 3.5)→Node 345(Node 3.1)→Node 260(Node 1.3)

When the Create Path message arrives at a transit zone 120 (Zone 3), the entry border node 365 (Node 3.5) forwards the request to the exit border node 345 (Node 3.1). When the Create Path message reaches node 345 (Node 3.1), path establishment is initiated within the zone by sending a Restore Path request to node 365 (Node 3.5). Node 345 (Node 3.1) forwards the Create Path request to node 260 (Node 1.3), the next node along the specified path. When the message finally reaches node 260 (Node 1.3) in the target zone, node 200 (Node 1.6) receives a Change Target request. Node 200 (Node 1.6) being the source node of the VP. If zone 100 (Zone 1) were a transit zone, the Change Target request would be sent to a proxy source node instead.

The Change Target request triggers node 200 (Node 1.6) to send a Restore Path request to node 260 (Node 1.3). When an acceptable instance of the Restore Path request arrives at node 260 (Node 1.3), node 260 (Node 1.3) formats and sends a Create Path response to node 345 (Node 3.1). The response, illustrated in Table 6, contains a list of ports allocated for the path on link 370 (Link 2). In this particular example, link 370 (Link 2) includes a port 3 and a port 6.

TABLE 6

| Field | Contents |
|---|---|
| Origin | 1.3 |
| Target | 3.1 |
| VPID | 0x20060001 |
| PathIndex | 2 |
| Path | 2.1, 3.5, 3.1, 1.3 |
| Ports | 3, 6 |

When the Create Path response reaches node 345 (Node 3.1), the create path response allocates the specified ports on link 370 (Link 2) and forwards a modified version of the response to node 3.5 (Node 3.5), as illustrated in Table 7.

TABLE 7

| Field | Contents |
|---|---|
| Origin | 3.1 |
| Target | 3.5 |
| VPID | 0x20060001 |
| PathIndex | 1 |
| Path | 2.1, 3.5, 3.1, 1.3 |
| Ports | Not used on intra-zone links |

Node 365 (Node 3.5), upon receiving the above response, allocates the required number of ports on "Link 3" 340, appends the required number of ports to the response, and sends the response to node 335 (Node 2.1), as illustrated in Table 8.

TABLE 8

| Field | Contents |
|---|---|
| Origin | 3.5 |
| Target | 2.1 |
| VPID | 0x20060001 |
| PathIndex | 0 |
| Path | 2.1, 3.5, 3.1, 1.3 |
| Ports | 7, 9 |

Node 335 (Node 2.1), upon receiving the response from node 365 (Node 3.5), allocates the specified port 7 and port 9 on link 340 (Link 3) and connects them to the sub-path in "Zone 2" 110. "Node 2.1" 335 also forwards the response to "Node 2.2" 310 which is the master border node, and thus completing the loop.

Failure Detection and Propagation in the Control of Inter-Zone/Intra-Zone Recovery Using In-Band Communications In a "flat" WaRP network, failures can be detected using, for example, standard SONET mechanisms. A fiber cut between nodes 240 and 310, for example, results in a loss of signal (LOS) condition at both nodes. The LOS condition generates an AIS downstream, an RDI upstream (if the path still exists), and an LOS defect locally. The defect is upgraded to a failure 2.5 seconds later, which causes an alarm to be sent to the Operations System (OS). The handling of the LOS condition follows Bellcore's recommendations in GR253, which allows nodes employing the WaRP™ protocol to inter-operate, and co-exist, with other network elements in the same network. The mesh restoration protocol is invoked as soon as the LOS defect is detected by the line card, which occurs 100μ after the failure. The 100μ detection period is determined by Bellcore requirements.

The arrival of the AIS at the downstream node causes the downstream node to send a similar alarm downstream. This continues from node to node, until the AIS finally reaches the source node of the affected VP, or a border node if the source node is located in a different zone. In the latter case, the border node restores the VP on behalf of the source node. The Bellcore specification (GR253) gives each node a maximum of 125 us (one frame time) to forward the AIS downstream, which allows failures to propagate very quickly toward the source node.

In a system according to the present invention, failure information can be communicated using in-band techniques. Such failure information can include a command, in the form of an action code, that indicates to various nodes in the network what actions (if any) should be performed by a given node. A set of example action codes is provided in Table 9.

TABLE 9

K2-Byte Action Codes.

| Action | Code | Meaning |
|---|---|---|
| IDLE | 0 | No action |
| RESTORED | 1 | Path restored |
| RESTORE_I | 2 | Restore path using intra-zone resources |
| RESTORE_X | 3 | Restore path using inter-zone resources |

These action codes and their effects are explained in further detail in connection with the discussion of FIGS. 5A, 5B and 5C.

FIG. 4 is a flow diagram illustrating the actions performed in generating failure information that is communicated using in-band techniques. In a hierarchical network, an intra-zone failure (e.g., an intra-zone link failure) is restored by a border node (typically, the border node closest to the failure, which acts as a proxy node), but the AIS/RDI alarms propagate all the way to the source node. The source node knows not to initiate failure recovery for a given AIS or RDI based on the manner in which WaRP™ uses bits in the K1 and K2 bytes of the SONET frame. Nodes that send the AIS and/or RDI also write the zone ID of the failed link into the K1 byte of the SONET header (step 400). Each of these nodes also encodes a RESTORE_I command (as listed in the action codes of Table 9, described below) into bits 4–7 of the K2 byte to further clarify the nature of the failure and the desired action (step 410). This indicates that intra-zone resources should, at least initially, be used to restore the now-failed VP. The node in question then sends the frame containing this information to a neighboring node on the given link (step 420). How this information is used depends upon actions taken by the receiving node, based on this information, which is discussed below.

Figure 5A:
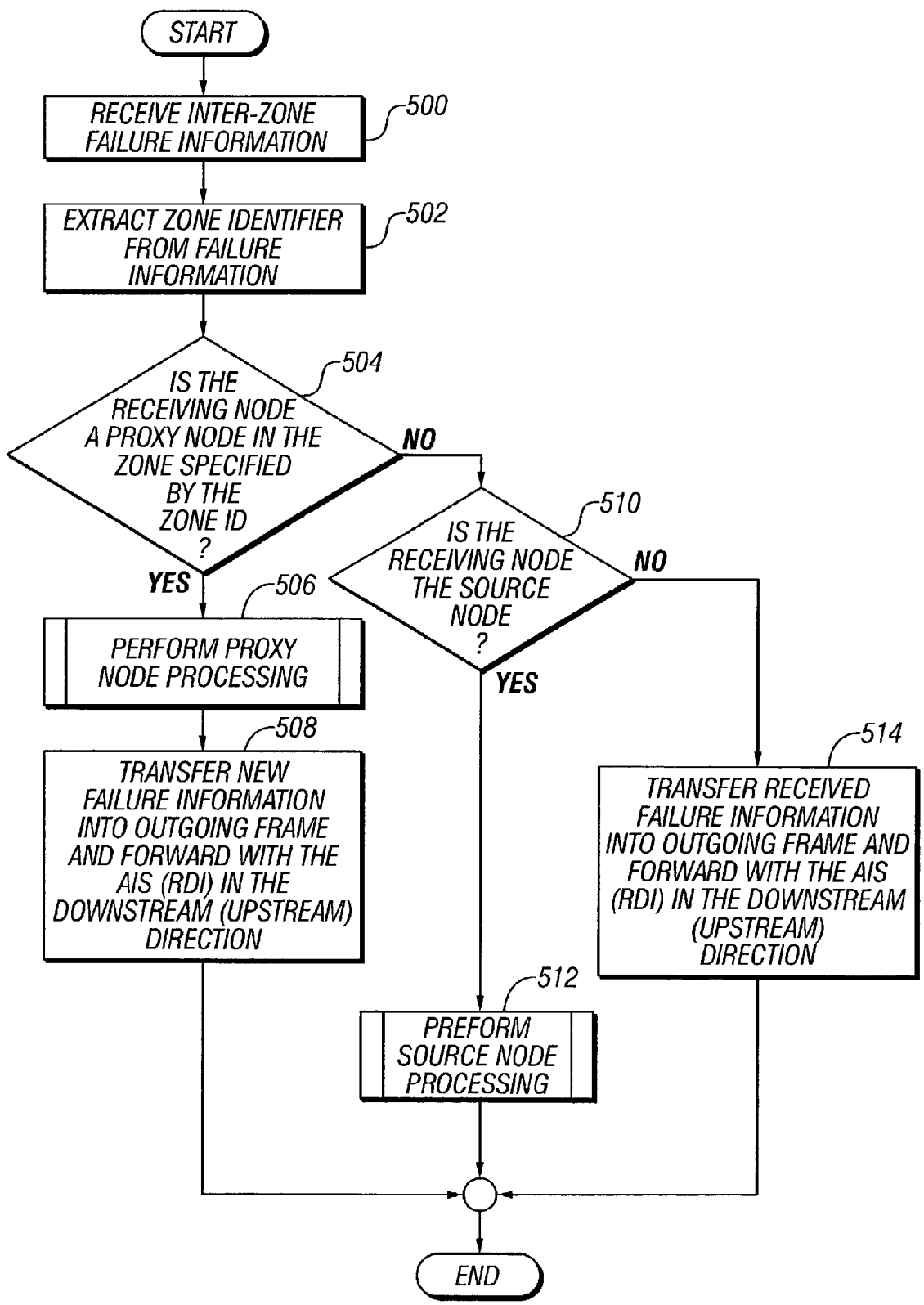
FIG. 5A is a flow diagram illustrating the actions performed in conveying received failure information.

FIG. 5A is a flow diagram illustrating the actions performed in conveying failure information that is received using in-band techniques. When the K1/K2 bytes arrive at an upstream/downstream node (step 500), the failure information carried therein is extracted (step 502). A determination is then made as to whether or not the node is a proxy node in the zone specified by the zone ID in the K1 byte (step 504). If the receiving node is a proxy node in the specified zone, proxy node processing is performed (step 506). An example of the processing performed by a proxy node is described in detail in connection with FIG. 5B. The failure information, as modified by the proxy node processing, is then transferred to the outgoing frame and forwarded AIS (RDI) in the downstream (upstream) direction (step 508).

If the receiving node is not a proxy node in the specified zone, a determination is made as to whether the receiving node is the VP's source node (step 510). If the receiving node is the VP's source node (step 510), source node processing is performed (step 512). If the receiving node is not the VP's source node (step 510), the node receiving the AIS/RDI simply copies the K1/K2 bytes into the frame traveling in the outgoing direction (step 514).

Figure 5B:
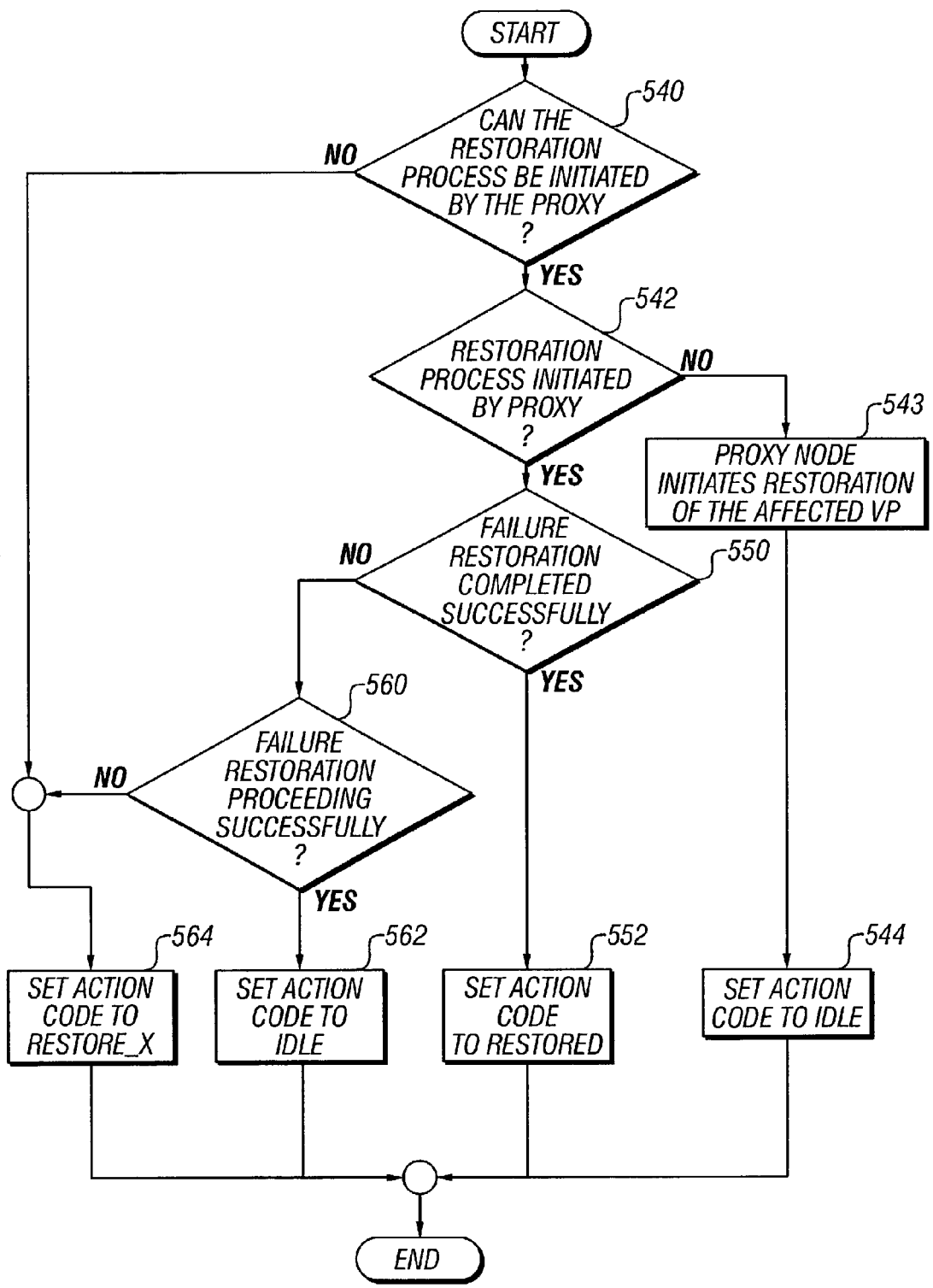
FIG. 5B is a flow diagram illustrating the actions performed in processing failure information at a proxy node.

FIG. 5B is a flow diagram illustrating the actions performed in processing failure information at a proxy node. First, a determination is made as to whether the given proxy node can perform a restoration process for the affected VP (step 540). This determination is based on the node's information as to the network and available resources. If the given proxy node cannot perform the restoration process, the proxy node sets the action code to RESTORE_X indicating that inter-zone restoration resources should be employed in restoring the failed VP (step 541). The RESTORE_X action code is used when an intra-zone restoration attempt fails (e.g., due to lack of resources). The RESTORE_X action code causes the source node to initiate and end-to-end restoration attempt using a Create Path packet. This is a last-resort action that is typically not encountered in a well-planned network.

Otherwise, a determination is then made as to whether the given proxy node has initiated a restoration process for the affected VP (step 542). If the proxy node has not initiated such a restoration process, the proxy node initiates such a process (step 543) and sets the action code to IDLE (step 544). This indicates that a proxy node is handling the restoration (at least, for the moment), and prevents the source node, as well as other border nodes, from taking any action with regard to restoring the affected VP. The proxy node initiates restoration of the affected VP using intra-zone resources. More specifically, restoration can be effected by employing a dynamic mesh restoration technique, such as is described in the commonly assigned patent application Ser. No. 09/750,668, filed Dec. 29, 2000, entitled, "VIRTUAL PATH RESTORATION USING FAST DYNAMIC MESH RESTORATION IN AN OPTICAL NETWORK" and having A. N. Saleh and S. E. Plote as inventors, which is hereby incorporated by reference herein, in its entirety and for all purposes. In the terms used therein, such restoration can be effected by sending a Restore Path Request (RPR) to one or more nodes within the zone in which the failure occurred.

If the proxy node has initiated such a restoration process, a determination is made as to whether the restoration process for the affected VP has completed (step 550). If the restoration process for the affected VP has successfully completed, the proxy node sets the action code to RESTORED, indicating that the affected VP has been successfully restored (step 552). If the restoration process for the affected VP has not completed, a determination is made as to whether the restoration process for the affected VP is proceeding successfully (step 560). If the restoration process for the affected VP is proceeding successfully, the proxy node sets the action code to IDLE, indicating that the source node, as well as other border nodes, should not take any action (step 562). Otherwise, if the restoration process for the affected VP has not been successful, the proxy node sets the action code to RESTORE_X, indicating (as noted) that inter-zone restoration resources should be employed in restoring the failed VP (step 541). In this case, the proxy node is, in effect, asking the source node to handle restoration of the affected VP.

Figure 5C:
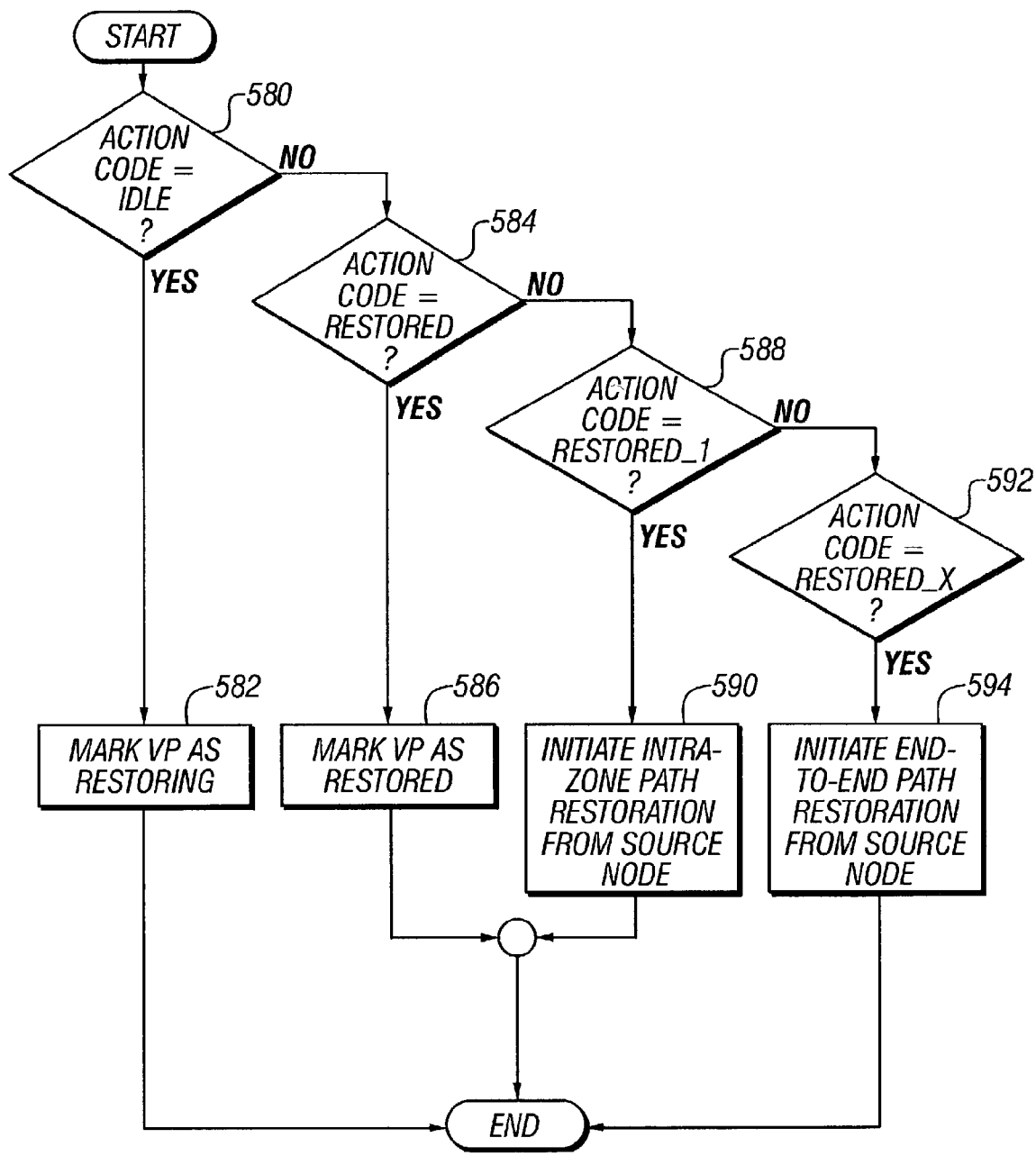
FIG. 5C is a flow diagram illustrating the actions performed in processing failure information at a source node.

FIG. 5C is a flow diagram illustrating the actions performed in processing failure information at a source node. First, a determination is made as to whether the action code (e.g., carried in the K-2 byte) is IDLE (step 580). If the action code that is received is IDLE, the source node simply marks the VP in its VP lookup table as RESTORING (step 582). If the action code that is received is not IDLE, a determination is made as to whether the action code received is RESTORED (step 584). If the action code that is received is RESTORED, the source node simply marks the VP in its VP lookup table as RESTORED (step 586). If the action code that is received is neither IDLE nor RESTORED, a determination is made as to whether the action code received is RESTORE_I (step 588). If the action code that is received is RESTORE_I, the source node initiates intra-zone path restoration (which is done from source node itself) (step 590). Lastly, a determination is made as to whether the action code received is RESTORE_X (step 592). If the action code is RESTORE_X, the source node initiates end-to-end path restoration (which is, again, done from source node itself) (step 594).

An Example Computing and Network Environment

Figure 6:
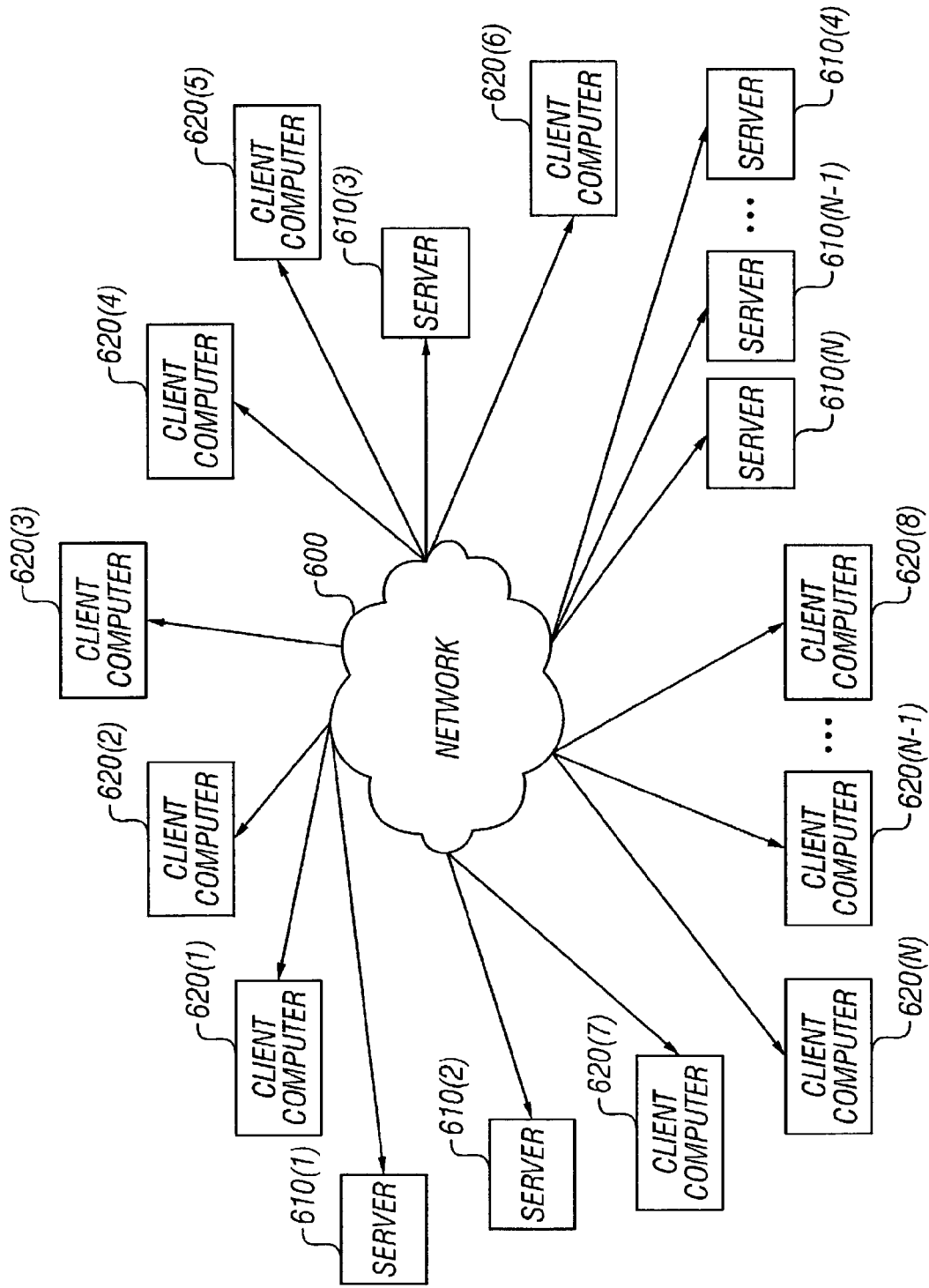
FIG. 6 is a block diagram illustrating a network environment in which embodiments of the present invention may be practiced.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)–(N) that are accessible by client computers 620(1)–(N). Communication between client computers 620(1)–(N) and servers 610(1)–(N) typically occurs over a publicly accessible network, such as a public switched telephone network (PSTN), a DSL connection, a cable modem connection or large bandwidth trunks (e.g., communications channels providing T1 or OC3 service). Client computers 620(1)–(N) access servers 610(1)–(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)–(N).

One or more of client computers 620(1)–(N) and/or one or more of servers 610(1)–(N) may be, for example, a computer system of any appropriate design, in general, including a A mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 620(1)–(N) is shown in detail in FIG. 6.

Figure 7:
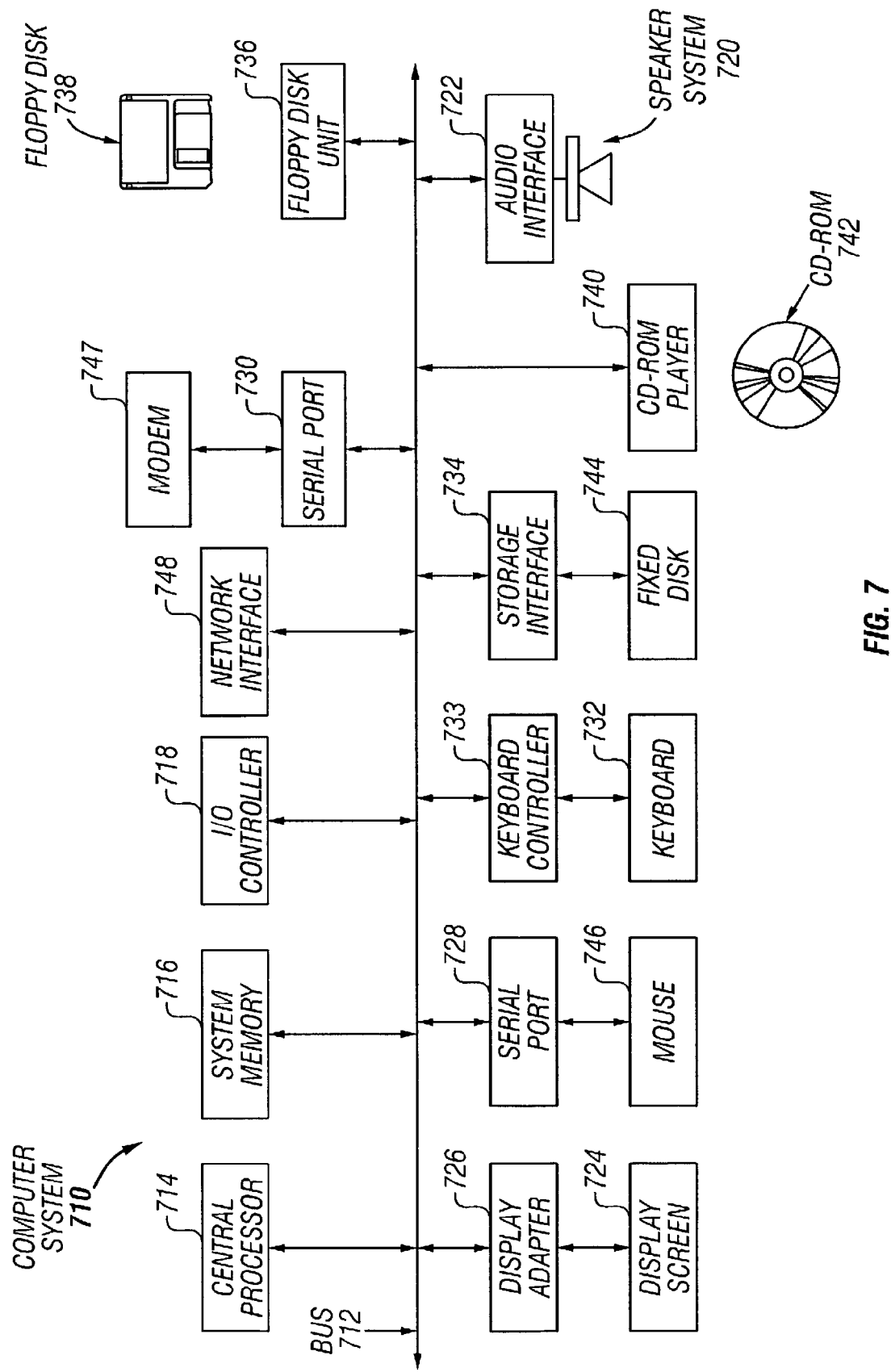
FIG. 7 is a block diagram illustrating a computer system suitable for implementing embodiments of the present invention.

FIG. 7 depicts a block diagram of a computer system 710 suitable for implementing the present invention, and example of one or more of client computers 620(1)–(N). Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator® 8.0, Microsoft Explorers 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
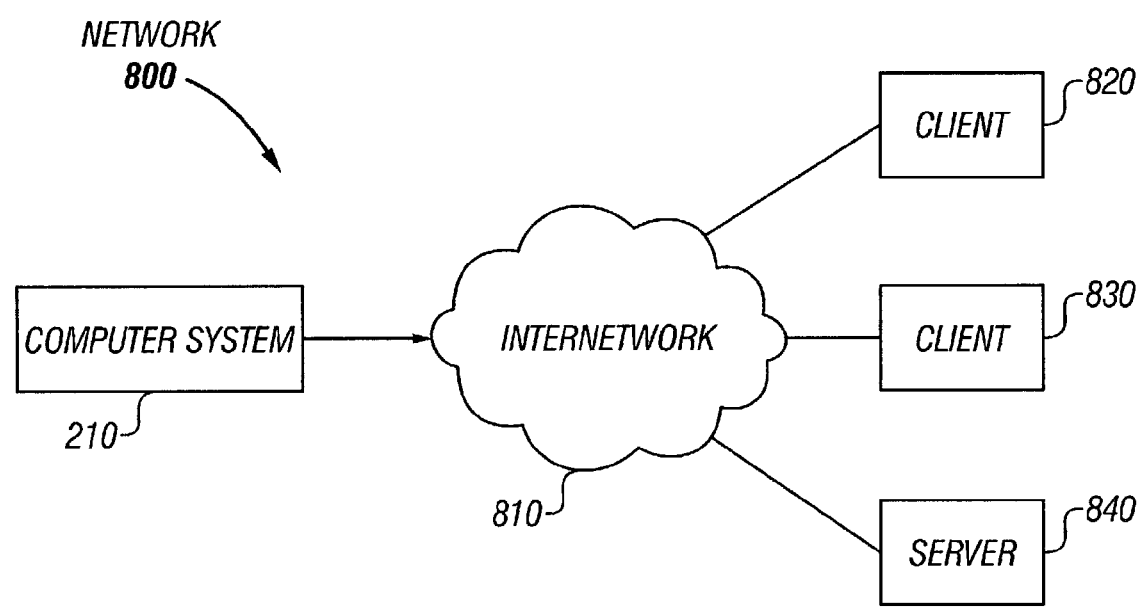
FIG. 8 is a block diagram illustrating the interconnection of the computer system of FIG. 7 to client and host systems.

FIG. 8 is a block diagram depicting a network 800 in which computer system 810 is coupled to an internetwork 810, which is coupled, in turn, to client systems 820 and 830, as well as a server 840. Internetwork 810 (e.g., the Internet) is also capable of coupling client systems 820 and 830, and server 840 to one another. With reference to computer system 810, modem 847, network interface 848 or some other method can be used to provide connectivity from computer system 810 to internetwork 810. Computer system 810, client system 820 and client system 830 are able to access information on server 840 using, for example, a web browser (not shown). Such a web browser allows computer system 810, as well as client systems 820 and 830, to access data on server 840 representing the pages of a website hosted on server 840. Protocols for exchanging data via the Internet are well known to those skilled in the art. Although FIG. 8 depicts the use of the Internet for exchanging data, the present invention is not limited to the Internet or any particular network-based environment.

Referring to FIGS. 6, 7 and 8, a browser running on computer system 810 employs a TCP/IP connection to pass a request to server 840, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. A method of communicating information regarding a failure comprising:
   generating failure information, wherein
      said failure affects a virtual path,
      said virtual path is between a first node and a second node,
      a first zone comprises said first node,
      a second zone comprises said second node, and
      said failure information comprises an indication whether intra-zone resources should be used to restore said virtual path; and
   sending said failure information.

2. The method of claim 1, wherein said failure information comprises:
   a zone identifier.

3. The method of claim 2, further comprising:
   determining said zone identifier by identifying a zone in which said failure has occurred.

4. The method of claim 1, wherein said failure information comprises:
   an action code.

5. The method of claim 4, wherein said action code comprises at least one of:
   an idle action,
   a restored action,
   a first restore path action, or
   a second restore path action.

6. The method of claim 5, wherein
   said idle action indicates no action need be performed, and
   said restored action indicates said virtual path has been successfully restored.

7. The method of claim 5, wherein said first restore path action indicates said virtual path should be restored using intra-zone resources.

8. The method of claim 5, wherein said second restore path action indicates said virtual path should be restored using inter-zone resources.

9. The method of claim 1, further comprising:
   communicating said failure information in an in-band channel.

10. The method of claim 9, further comprising:
    inserting said failure information in a frame, wherein
       said failure information comprises a zone identifier and an action code.

11. The method of claim 10, wherein said zone identifier identifies a zone in which said failure has occurred.

12. The method of claim 10, wherein said action code comprises at least one of:
    an idle action,
    a restored action,
    a first restore path action, or
    a second restore path action.

13. The method of claim 12, wherein said first restore path action indicates said virtual path should be restored using intra-zone resources.

14. The method of claim 12, wherein said second restore path action indicates said virtual path should be restored using inter-zone resources.

15. The method of claim 10, wherein said frame is a SONET frame and said inserting said failure information comprises:

inserting said zone identifier in a K1 byte of said SONET frame, and inserting said action code in a K2 byte of said SONET frame.

16. The method of claim 15, wherein said inserting is performed at a third node and said communicating further comprises:

communicating said failure information from said third node to a fourth node, wherein said SONET frame comprises at least one of an AIS or an RDI.

17. The method of claim 16, wherein said fourth node is a border node.

18. The method of claim 16, wherein said border node acts as a proxy node for one of said first or said second nodes, and the method further comprises:

initiating restoration of said virtual path, said restoration being initiated by said proxy node.

19. The method of claim 1, wherein said failure information comprises an indication whether inter-zone resources should be used to restore said virtual path.

20. A computer system comprising:

a processor;

computer readable medium coupled to said processor; and computer code, for communicating information regarding a failure and encoded in said computer readable medium, configured to cause said processor to:

generate failure information, wherein said failure affects a virtual path, said virtual path is between a first node and a second node, a first zone comprises said first node, a second zone comprises said second node, and said failure information comprises an indication whether intra-zone resources should be used to restore said virtual path.

21. The computer system of claim 20, wherein said failure information comprises:

a zone identifier.

22. The computer system of claim 21, wherein said computer code is further configured to cause said processor to:

determine said zone identifier by identifying a zone in which said failure has occurred.

23. The computer system of claim 20, wherein said failure information comprises:

an action code.

24. The computer system of claim 23, wherein said action code comprises at least one of:

an idle action, a restored action, a first restore path action, or a second restore path action.

25. The computer system of claim 24, wherein said idle action indicates no action need be performed, and said restored action indicates said virtual path has been successfully restored.

26. The computer system of claim 24, wherein said first restore path action indicates said virtual path should be restored using intra-zone resources.

27. The computer system of claim 24, wherein said second restore path action indicates said virtual path should be restored using inter-zone resources.

28. The computer system of claim 20, wherein said computer code is further configured to cause said processor to:

send said failure information.

29. The computer system of claim 28, wherein said computer code configured to cause said processor to send said failure information is further configured to cause said processor to:

communicate said failure information in an in-band channel.

30. The computer system of claim 29, wherein said computer code is further configured to cause said processor to:

insert said failure information in a frame, wherein said failure information comprises a zone identifier and an action code.

31. The computer system of claim 29, wherein said zone identifier identifies a zone in which said failure has occurred.

32. The computer system of claim 30, wherein said action code comprises at least one of:

an idle action, a restored action, a first restore path action, or a second restore path action.

33. The computer system of claim 32, wherein said first restore path action indicates said virtual path should be restored using intra-zone resources.

34. The computer system of claim 32, wherein said second restore path action indicates said virtual path should be restored using inter-zone resources.

35. The computer system of claim 30, wherein said frame is a SONET frame, and said computer code configured to cause said processor to insert said failure information is further configured to cause said processor to:

insert said zone identifier in a K1 byte of said SONET frame, and insert said action code in a K2 byte of said SONET frame.

36. The computer system of claim 35, wherein said inserting is performed at a third node, and said computer code configured to cause said processor to communicate is further configured to cause said processor to:

communicate said failure information from said third node to a fourth node, wherein said SONET frame comprises at least one of an AIS or an RDI.

37. The computer system of claim 36, wherein said fourth node is a border node.

38. The computer system of claim 36, wherein said border node acts as a proxy node for one of said first or said second nodes, and said computer code is further configured to cause said processor to:

initiate restoration of said virtual path, said restoration being initiated by said proxy node.

39. The computer system of claim 20, wherein said failure information comprises an indication whether inter-zone resources should be used to restore said virtual path.

40. A computer readable storage medium storing computer-executable instructions comprising:

a first set of instructions, executable on a computer system, configured to generate failure information, wherein said failure affects a virtual path, said virtual path is between a first node and a second node, a first zone comprises said first node, a second zone comprises said second node, and said failure information comprises an indication whether intra-zone resources should be used to restore said virtual path.

41. The computer readable storage medium of claim 40, wherein said failure information comprises:
a zone identifier.

42. The computer readable storage medium of claim 41, said computer-executable instructions further comprising:
a second set of instructions, executable on said computer system, configured to determine said zone identifier by identifying a zone in which said failure has occurred.

43. The computer readable storage medium of claim 40, wherein said failure information comprises:
an action code.

44. The computer readable storage medium of claim 43, wherein said action code comprises at least one of:
an idle action,
a restored action,
a first restore path action, or
a second restore path action.

45. The computer readable storage medium of claim 44, wherein
said idle action indicates no action need be performed, and
said restored action indicates said virtual path has been successfully restored.

46. The computer readable storage medium of claim 44, wherein said first restore path action indicates said virtual path should be restored using intra-zone resources.

47. The computer readable storage medium of claim 44, wherein said second restore path action indicates said virtual path should be restored using inter-zone resources.

48. The computer readable storage medium of claim 40, said computer-executable instructions further comprising:
a second set of instructions, executable on said computer system, configured to send said failure information.

49. The computer readable storage medium of claim 48, wherein said second set of instructions further comprises:
a first sub-set of said second set of instructions, executable on said computer system, configured to communicate said failure information in an in-band channel.

50. The computer readable storage medium of claim 49, said computer-executable instructions further comprising:
a third set of instructions, executable on said computer system, configured to insert said failure information in a frame, wherein
said failure information comprises a zone identifier and an action code.

51. The computer readable storage medium of claim 50, wherein said zone identifier identifies a zone in which said failure has occurred.

52. The computer readable storage medium of claim 50, wherein said action code comprises at least one of:
an idle action,
a restored action,
a first restore path action, or
a second restore path action.

53. The computer readable storage medium of claim 52, wherein said first restore path action indicates said virtual path should be restored using intra-zone resources.

54. The computer readable storage medium of claim 52, wherein said second restore path action indicates said virtual path should be restored using inter-zone resources.

55. The computer readable storage medium of claim 50, wherein said frame is a SONET frame, and said third set of instructions further comprises:
a first sub-set of instructions, executable on said computer system, configured to insert said zone identifier in a K1 byte of said SONET frame; and
a second sub-set of instructions, executable on said computer system, configured to insert said action code in a K2 byte of said SONET frame.

56. The computer readable storage medium of claim 55, wherein said third set of instructions is performed at a third node, and said first sub-set of said second set of instructions further comprises:
a first sub-sub-set of instructions, executable on said computer system, configured to communicate said failure information from said third node to a fourth node, wherein said SONET frame comprises at least one of an AIS or an RDI.

57. The computer readable storage medium of claim 56, wherein said fourth node is a border node.

58. The computer readable storage medium of claim 56, wherein said border node acts as a proxy node for one of said first or said second nodes, said computer-executable instructions further comprising:
a second set of instructions, executable on said computer system, configured to initiate restoration of said virtual path, said restoration being initiated by said proxy node.

59. An apparatus for communicating information regarding a failure comprising:
means for generating failure information, wherein
said failure affects a virtual path,
said virtual path is between a first node and a second node,
a first zone comprises said first node,
a second zone comprises said second node, and
said failure information comprises an indication whether intra-zone resources should be used to restore said virtual path; and
means for sending said failure information.

60. The apparatus of claim 59, wherein said failure information comprises:
a zone identifier.

61. The apparatus of claim 60, further comprising:
means for determining said zone identifier by identifying a zone in which said failure has occurred.

62. The apparatus of claim 59, wherein said failure information comprises:
an action code.

63. The apparatus of claim 62, wherein said action code comprises at least one of:
an idle action,
a restored action,
a first restore path action, or
a second restore path action.

64. The apparatus of claim 63, wherein
said idle action indicates no action need be performed, and
said restored action indicates said virtual path has been successfully restored.

65. The apparatus of claim 61, wherein said first restore path action indicates said virtual path should be restored using intra-zone resources.

66. The apparatus of claim 61, wherein said second restore path action indicates said virtual path should be restored using inter-zone resources.

67. The apparatus of claim 59, further comprising:
means for communicating said failure information in an in-band channel.

68. The apparatus of claim 67, further comprising:
means for inserting said failure information in a frame, wherein
said failure information comprises a zone identifier and an action code.

69. The apparatus of claim 68, wherein said zone identifier identifies a zone in which said failure has occurred.

70. The apparatus of claim 68, wherein said action code comprises at least one of:
an idle action,
a restored action,
a first restore path action, or
a second restore path action.

71. The apparatus of claim 70, wherein said first restore path action indicates said virtual path should be restored using intra-zone resources.

72. The apparatus of claim 70, wherein said second restore path action indicates said virtual path should be restored using inter-zone resources.

73. The apparatus of claim 68, wherein said frame is a SONET frame and said means for inserting said failure information comprises:
means for inserting said zone identifier in a K1 byte of said SONET frame, and
means for inserting said action code in a K2 byte of said SONET frame.

74. The apparatus of claim 73, wherein a third node comprises said means for inserting and said means for communicating further comprises:
means for communicating said failure information from said third node to a fourth node,
wherein said SONET frame comprises at least one of an AIS or an RDI.

75. The apparatus of claim 74, wherein said fourth node is a border node.

76. The apparatus of claim 74, wherein said border node acts as a proxy node for one of said first or said second nodes, and further comprising:
means for initiating restoration of said virtual path, said restoration being initiated by said proxy node.

77. A method of communicating information regarding a failure comprising:
receiving failure information at a node, wherein
said failure affects a virtual path,
said virtual path is between a first node and a second node,
a first zone comprises said first node,
a second zone comprises said second node, and
said failure information comprises an indication whether intra-zone resources should be used to restore said virtual path; and
performing acts of a restoration process in response to said failure information.

78. The method of claim 77, wherein said failure information comprises:
a zone identifier; and
an action code.

79. The method of claim 78, wherein said action code comprises at least one of:
an idle action,
a restored action,
a first restore path action, or
a second restore path action.

80. The method of claim 79, wherein
said idle action indicates no action need be performed, and
said restored action indicates said virtual path has been successfully restored.

81. The method of claim 79, wherein said first restore path action indicates said virtual path should be restored using intra-zone resources.

82. The method of claim 79, wherein said second restore path action indicates said virtual path should be restored using inter-zone resources.

83. The method of claim 77, further comprising:
determining if said node is a proxy node.

84. The method of claim 83, wherein said failure information comprises:
an action code.

85. The method of claim 84, further comprising:
if said node is a proxy node,
determining if said proxy node can initiate a restoration process.

86. The method of claim 85, further comprising:
if said proxy node cannot initiate a restoration process, setting said action code to RESTORE_X.

87. The method of claim 86, further comprising:
communicating said failure information to another node.

88. The method of claim 85, further comprising:
if said proxy node can initiate a restoration process,
determining if said restoration process has already been initiated by said proxy node.

89. The method of claim 88, further comprising:
if said restoration process has not already been initiated by said proxy node,
causing said proxy node to initiate said restoration process, and
setting said action code to IDLE.

90. The method of claim 89, further comprising:
communicating said failure information to another node.

91. The method of claim 88, further comprising:
if said restoration process has already been initiated by said proxy node,
determining if said restoration process has completed successfully.

92. The method of claim 91, further comprising:
if said restoration process has completed successfully, setting said action code to RESTORED.

93. The method of claim 92, further comprising:
communicating said failure information to another node.

94. The method of claim 91, further comprising:
if said restoration process has not completed successfully,
determining if said restoration process is proceeding successfully.

95. The method of claim 94, further comprising:
if said restoration process is proceeding successfully, setting said action code to IDLE.

96. The method of claim 95, further comprising:
communicating said failure information to another node.

97. The method of claim 94, further comprising:
if said restoration process is not proceeding successfully, setting said action code to RESTORE_X.

98. The method of claim 97, further comprising:
communicating said failure information to another node.

99. The method of claim 77, further comprising:
determining if said node is a source node, wherein said node being said source node indicates that said node is one of said first or said second nodes.

100. The method of claim 99, wherein said failure information comprises:
an action code.

101. The method of claim 100, further comprising:
if said node is a source node,
  determining if said action code is IDLE.
102. The method of claim 101, further comprising:
if said action code is IDLE,
  setting an entry in a virtual path lookup table corresponding to said virtual path to RESTORING.
103. The method of claim 101, further comprising:
if said action code is IDLE,
  preventing said node from initiating a restoration process.
104. The method of claim 100, further comprising:
if said node is a source node,
  determining if said action code is RESTORED.
105. The method of claim 104, further comprising:
if said action code is RESTORED,
  setting an entry in a virtual path lookup table corresponding to said virtual path to RESTORED.
106. The method of claim 100, further comprising:
if said node is a source node,
  determining if said action code is RESTORE_I.
107. The method of claim 106, further comprising:
if said action code is RESTORE_I,
  initiating an intra-zone restoration process.
108. The method of claim 100, further comprising:
if said node is a source node,
  determining if said action code is RESTORE_X.
109. The method of claim 108, further comprising:
if said action code is RESTORE_X,
  initiating an end-to-end restoration process.
110. The method of claim 109, further comprising:
communicating said failure information.
111. The method of claim 77, further comprising:
communicating said failure information.
112. The method of claim 111, wherein said communicating comprises:
inserting said failure information into a frame.
113. The method of claim 112, wherein said frame is a SONET frame and said inserting said failure information comprises:
  inserting said zone identifier in a K1 byte of said SONET frame, and
  inserting said action code in a K2 byte of said SONET frame.
114. The method of claim 113, wherein said inserting is performed at a third node and the method further comprises:
  communicating said failure information from said third node to a fourth node, wherein said SONET frame comprises at least one of an AIS or an RDI.
115. The method of claim 77, wherein said failure information comprises an indication whether inter-zone resources should be used to restore said virtual path.
116. A computer system comprising:
  a processor;
  computer readable medium coupled to said processor; and
  computer code, for communicating information regarding a failure and encoded in said computer readable medium, configured to cause said processor to:
    receive failure information at a node and perform acts of a restoration process in response to said failure information, wherein
      said failure affects a virtual path,
      said virtual path is between a first node and a second node,
      a first zone comprises said first node,
      a second zone comprises said second node, and
      said failure information comprises an indication whether intra-zone resources should be used to restore said virtual path.
117. The computer system of claim 116, wherein said failure information comprises:
  a zone identifier; and
  an action code.
118. The computer system of claim 117, wherein said action code comprises at least one of:
  an idle action,
  a restored action,
  a first restore path action, or
  a second restore path action.
119. The computer system of claim 118, wherein
  said idle action indicates no action need be performed, and
  said restored action indicates said virtual path has been successfully restored.
120. The computer system of claim 118, wherein said first restore path action indicates said virtual path should be restored using intra-zone resources.
121. The computer system of claim 118, wherein said second restore path action indicates said virtual path should be restored using inter-zone resources.
122. The computer system of claim 116, wherein said computer code is further configured to cause said processor to:
  determine if said node is a proxy node.
123. The computer system of claim 122, wherein said failure information comprises:
  an action code.
124. The computer system of claim 123, wherein said computer code is further configured to cause said processor to:
  determine if said proxy node can initiate a restoration process, if said node is a proxy node.
125. The computer system of claim 124, wherein said computer code is further configured to cause said processor to:
  set said action code to RESTORE_X, if said proxy node cannot initiate a restoration process.
126. The computer system of claim 125, wherein said computer code is further configured to cause said processor to:
  communicate said failure information to another node.
127. The computer system of claim 124, wherein said computer code is further configured to cause said processor to:
  determine if said restoration process has already been initiated by said proxy node, if said proxy node can initiate a restoration process.
128. The computer system of claim 127, wherein said computer code is further configured to cause said processor to:
  if said restoration process has not already been initiated by said proxy node,
    cause said proxy node to initiate said restoration process, and
    set said action code to IDLE.
129. The computer system of claim 128, wherein said computer code is further configured to cause said processor to:
  communicate said failure information to another node.
130. The computer system of claim 127, wherein said computer code is further configured to cause said processor to:

if said restoration process has already been initiated by said proxy node,
   determine if said restoration process has completed successfully.

131. The computer system of claim 130, wherein said computer code is further configured to cause said processor to:
   if said restoration process has completed successfully, set said action code to RESTORED.

132. The computer system of claim 131, wherein said computer code is further configured to cause said processor to:
   communicate said failure information to another node.

133. The computer system of claim 130, wherein said computer code is further configured to cause said processor to:
   if said restoration process has not completed successfully, determine if said restoration process is proceeding successfully.

134. The computer system of claim 133, wherein said computer code is further configured to cause said processor to:
   if said restoration process is proceeding successfully, set said action code to IDLE.

135. The computer system of claim 134, wherein said computer code is further configured to cause said processor to:
   communicate said failure information to another node.

136. The computer system of claim 133, wherein said computer code is further configured to cause said processor to:
   if said restoration process is not proceeding successfully, set said action code to RESTORE_X.

137. The computer system of claim 134, wherein said computer code is further configured to cause said processor to:
   communicate said failure information to another node.

138. The computer system of claim 116, wherein said computer code is further configured to cause said processor to:
   determine if said node is a source node, wherein said node being said source node indicates that said node in is one of said first or said second nodes.

139. The computer system of claim 138, wherein said failure information comprises:
   an action code.

140. The computer system of claim 139, wherein said computer code is further configured to cause said processor to:
   if said node is a source node,
      determine if said action code is IDLE.

141. The computer system of claim 140, wherein said computer code is further configured to cause said processor to:
   if said action code is IDLE,
      set an entry in a virtual path lookup table corresponding to said virtual path to RESTORING.

142. The computer system of claim 140, wherein said computer code is further configured to cause said processor to:
   if said action code is IDLE,
      prevent said node from initiating a restoration process.

143. The computer system of claim 139, wherein said computer code is further configured to cause said processor to:
   if said node is a source node,
      determine if said action code is RESTORED.

144. The computer system of claim 143, wherein said computer code is further configured to cause said processor to:
   if said action code is RESTORED,
      set an entry in a virtual path lookup table corresponding to said virtual path to RESTORED.

145. The computer system of claim 139, wherein said computer code is further configured to cause said processor to:
   if said node is a source node,
      determine if said action code is RESTORE_I.

146. The computer system of claim 145, wherein said computer code is further configured to cause said processor to:
   if said action code is RESTORE_I,
      initiate an intra-zone restoration process.

147. The computer system of claim 139, wherein said computer code is further configured to cause said processor to:
   if said node is a source node,
      determine if said action code is RESTORE_X.

148. The computer system of claim 147, wherein said computer code is further configured to cause said processor to:
   if said action code is RESTORE_X,
      initiate an end-to-end restoration process.

149. The computer system of claim 148, wherein said computer code is further configured to cause said processor to:
   communicate said failure information.

150. The computer system of claim 116, wherein said computer code is further configured to cause said processor to:
   communicate said failure information.

151. The computer system of claim 150, wherein said computer code configured to communicate said failure information is further configured to cause said processor to:
   insert said failure information into a frame.

152. The computer system of claim 150, wherein said frame is a SONET frame and said computer code configured to cause said processor to insert said failure information is further configured to cause said processor to:
   insert said zone identifier in a K1 byte of said SONET frame, and
   insert said action code in a K2 byte of said SONET frame.

153. The computer system of claim 152, wherein said computer code configured to cause said processor to insert said failure information is executed at a third node, and said computer code is further configured to cause said processor to:
   communicate said failure information from said third node to a fourth node, wherein said SONET frame comprises at least one of an AIS or an RDI.

154. The computer system of claim 116, wherein said failure information comprises an indication whether inter-zone resources should be used to restore said virtual path.

155. A computer readable storage medium storing computer-executable instructions comprising:
   a first set of instructions, executable on a computer system, configured to receive failure information at a node and perform acts of a restoration process in response to said failure information, wherein
      said failure affects a virtual path,
      said virtual path is between a first node and a second node,
      a first zone comprises said first node,
      a second zone comprises said second node, and said failure information comprises an indication whether intra-zone resources should be used to restore said virtual path.

156. The computer readable storage medium of claim 155, wherein said failure information comprises:
a zone identifier; and
an action code.

157. The computer readable storage medium of claim 156, wherein said action code comprises at least one of:
an idle action,
a restored action,
a first restore path action, or
a second restore path action.

158. The computer readable storage medium of claim 157, wherein
said idle action indicates no action need be performed, and
said restored action indicates said virtual path has been successfully restored.

159. The computer readable storage medium of claim 157, wherein said first restore path action indicates said virtual path should be restored using intra-zone resources.

160. The computer readable storage medium of claim 157, wherein said second restore path action indicates said virtual path should be restored using inter-zone resources.

161. The computer readable storage medium of claim 155, said computer-executable instructions further comprising:
a second set of instructions, executable on said computer system, configured to determine if said node is a proxy node.

162. The computer readable storage medium of claim 161, wherein said failure information comprises:
an action code.

163. The computer readable storage medium of claim 162, said computer-executable instructions further comprising:
a third set of instructions, executable on said computer system, configured to determine if said proxy node can initiate a restoration process, if said node is a proxy node.

164. The computer readable storage medium of claim 163, said computer-executable instructions further comprising:
a fourth set of instructions, executable on said computer system, configured to set said action code to RESTORE_X, if said proxy node cannot initiate a restoration process.

165. The computer readable storage medium of claim 163, said computer-executable instructions further comprising:
a fifth set of instructions, executable on said computer system, configured to communicate said failure information to another node.

166. The computer readable storage medium of claim 163, said computer-executable instructions further comprising:
a fourth set of instructions, executable on said computer system, configured to determine if said restoration process has already been initiated by said proxy node, if said proxy node can initiate a restoration process.

167. The computer readable storage medium of claim 166, said computer-executable instructions further comprising:
a fifth set of instructions, executable on said computer system, configured to, if said restoration process has not already been initiated by said proxy node,
cause said proxy node to initiate said restoration process, and
set said action code to IDLE.

168. The computer readable storage medium of claim 167, said computer-executable instructions further comprising:
a sixth set of instructions, executable on said computer system, configured to communicate said failure information to another node.

169. The computer readable storage medium of claim 166, said computer-executable instructions further comprising:
a fifth set of instructions, executable on said computer system, configured to, if said restoration process has already been initiated by said proxy node,
determine if said restoration process has completed successfully.

170. The computer readable storage medium of claim 169, said computer-executable instructions further comprising:
a sixth set of instructions, executable on said computer system, configured to, if said restoration process has completed successfully,
set said action code to RESTORED.

171. The computer readable storage medium of claim 170, said computer-executable instructions further comprising:
a seventh set of instructions, executable on said computer system, configured to communicate said failure information to another node.

172. The computer readable storage medium of claim 169, said computer-executable instructions further comprising:
a sixth set of instructions, executable on said computer system, configured to, if said restoration process has not completed successfully,
determine if said restoration process is proceeding successfully.

173. The computer readable storage medium of claim 172, said computer-executable instructions further comprising:
a seventh set of instructions, executable on said computer system, configured to, if said restoration process is proceeding successfully,
set said action code to IDLE.

174. The computer readable storage medium of claim 173, said computer-executable instructions further comprising:
a eighth set of instructions, executable on said computer system, configured to communicate said failure information to another node.

175. The computer readable storage medium of claim 172, said computer-executable instructions further comprising:
a seventh set of instructions, executable on said computer system, configured to, if said restoration process is not proceeding successfully,
set said action code to RESTORE_X.

176. The computer readable storage medium of claim 175, said computer-executable instructions further comprising:
a ninth set of instructions, executable on said computer system, configured to communicate said failure information to another node.

177. The computer readable storage medium of claim 155, said computer-executable instructions further comprising:

a second set of instructions, executable on said computer system, configured to determine if said node is a source node, wherein said node being said source node indicates that said node in is one of said first or said second nodes.

178. The computer readable storage medium of claim 177, wherein said failure information comprises:
an action code.

179. The computer readable storage medium of claim 178, said computer-executable instructions further comprising:
a third set of instructions, executable on said computer system, configured to, if said node is a source, determine if said action code is IDLE.

180. The computer readable storage medium of claim 179, said computer-executable instructions further comprising:
a fourth set of instructions, executable on said computer system, configured to, if said action code is IDLE, set an entry in a virtual path lookup table corresponding to said virtual path to RESTORING.

181. The computer readable storage medium of claim 179, said computer-executable instructions further comprising:
a fourth set of instructions, executable on said computer system, configured to, if said action code is IDLE, prevent said node from initiating a restoration process.

182. The computer readable storage medium of claim 178, said computer-executable instructions further comprising:
a third set of instructions, executable on said computer system, configured to, if said node is a source node, determine if said action code is RESTORED.

183. The computer readable storage medium of claim 182, said computer-executable instructions further comprising:
a fourth set of instructions, executable on said computer system, configured to, if said action code is RESTORED, set an entry in a virtual path lookup table corresponding to said virtual path to RESTORED.

184. The computer readable storage medium of claim 178, said computer-executable instructions further comprising:
a third set of instructions, executable on said computer system, configured to, if said node is a source node, determine if said action code is RESTORE_I.

185. The computer readable storage medium of claim 184, said computer-executable instructions further comprising:
a fourth set of instructions, executable on said computer system, configured to, if said action code is RESTORE_I, initiate an intra-zone restoration process.

186. The computer readable storage medium of claim 178, said computer-executable instructions further comprising:
a third set of instructions, executable on said computer system, configured to, if said node is a source node, determine if said action code is RESTORE_X.

187. The computer readable storage medium of claim 186, said computer-executable instructions further comprising:
a fourth set of instructions, executable on said computer system, configured to, if said action code is RESTORE_X, initiate an end-to-end restoration process.

188. The computer readable storage medium of claim 186, said computer-executable instructions further comprising:
a fourth set of instructions, executable on said computer system, configured to communicate said failure information.

189. The computer readable storage medium of claim 155, said computer-executable instructions further comprising:
a second set of instructions, executable on said computer system, configured to communicate said failure information.

190. The computer readable storage medium of claim 155, wherein said second set of instructions comprises:
a first sub-set of instructions, executable on said computer system, configured to insert said failure information into a frame.

191. The computer readable storage medium of claim 190, wherein said frame is a SONET frame, and said first sub-set of instructions comprises:
a first sub-sub-set of instructions, executable on said computer system, configured to insert said zone identifier in a K1 byte of said SONET frame; and
a second sub-sub-set of instructions, executable on said computer system, configured to insert said action code in a K2 byte of said SONET frame.

192. The computer readable storage medium of claim 191, wherein said first sub-set of instructions are executed at a third node, and said computer-executable instructions further comprises:
a third set of instructions, executable on said computer system, configured to communicate said failure information from said third node to a fourth node,
wherein said SONET frame comprises at least one of an AIS or an RDI.

193. An apparatus for communicating information regarding a failure comprising:
means for receiving failure information at a node, wherein said failure affects a virtual path,
said virtual path is between a first node and a second node,
a first zone comprises said first node,
a second zone comprises said second node, and
said failure information comprises an indication whether intra-zone resources should be used to restore said virtual path; and
means for performing acts of a restoration process in response to said failure information.

194. The apparatus of claim 193, wherein said failure information comprises:
a zone identifier; and
an action code.

195. The apparatus of claim 194, wherein said action code comprises at least one of:
an idle action,
a restored action,
a first restore path action, or
a second restore path action.

196. The apparatus of claim 195, wherein
said idle action indicates no action need be performed, and
said restored action indicates said virtual path has been successfully restored.

197. The apparatus of claim 195, wherein said first restore path action indicates said virtual path should be restored using intra-zone resources.

198. The apparatus of claim 195, wherein said second restore path action indicates said virtual path should be restored using inter-zone resources.

199. The apparatus of claim 193, further comprising:
means for determining if said node is a proxy node.

200. The apparatus of claim 199, wherein said failure information comprises:
an action code.

201. The apparatus of claim 200, further comprising:
means for determining if said proxy node can initiate a restoration process, if said node is a proxy node.

202. The apparatus of claim 201, further comprising:
setting said action code to RESTORE_X, if said proxy node cannot initiate a restoration process.

203. The apparatus of claim 202, further comprising:
communicating said failure information to another node.

204. The apparatus of claim 201, further comprising:
determining if said restoration process has already been initiated by said proxy node, if said proxy node can initiate a restoration process.

205. The apparatus of claim 204, further comprising:
causing said proxy node to initiate said restoration process, if said restoration process has not already been initiated by said proxy node, and
setting said action code to IDLE, also if said restoration process has not already been initiated by said proxy node.

206. The apparatus of claim 205, further comprising:
communicating said failure information to another node.

207. The apparatus of claim 204, further comprising:
determining if said restoration process has completed successfully, if said restoration process has already been initiated by said proxy node.

208. The apparatus of claim 207, further comprising:
setting said action code to RESTORED, if said restoration process has completed successfully.

209. The apparatus of claim 208, further comprising:
communicating said failure information to another node.

210. The apparatus of claim 207, further comprising:
determining if said restoration process is proceeding successfully, if said restoration process has not completed successfully.

211. The apparatus of claim 210, further comprising:
setting said action code to IDLE, if said restoration process is proceeding successfully.

212. The apparatus of claim 211, further comprising:
communicating said failure information to another node.

213. The apparatus of claim 210, further comprising:
setting said action code to RESTORE_X, if said restoration process is not proceeding successfully.

214. The apparatus of claim 213, further comprising:
communicating said failure information to another node.

215. The apparatus of claim 193, further comprising:
determining if said node is a source node, wherein said node being said source node indicates that said node in is one of said first or said second nodes.

216. The apparatus of claim 215, wherein said failure information comprises:
an action code.

217. The apparatus of claim 216, further comprising:
determining if said action code is IDLE, if said node is a source node.

218. The apparatus of claim 217, further comprising:
setting an entry in a virtual path lookup table corresponding to said virtual path to RESTORING, if said action code is IDLE.

219. The apparatus of claim 217, further comprising:
preventing said node from initiating a restoration process, if said action code is IDLE.

220. The apparatus of claim 216, further comprising:
determining if said action code is RESTORED, if said node is a source node.

221. The apparatus of claim 220, further comprising:
setting an entry in a virtual path lookup table corresponding to said virtual path to RESTORED, if said action code is RESTORED.

222. The apparatus of claim 216, further comprising:
determining if said action code is RESTORE_I, if said node is a source node.

223. The apparatus of claim 222, further comprising:
initiating an intra-zone restoration process, if said action code is RESTORE_I.

224. The apparatus of claim 216, further comprising:
determining if said action code is RESTORE_X, if said node is a source node.

225. The apparatus of claim 224, further comprising:
initiating an end-to-end restoration process, if said action code is RESTORE_X.

226. The apparatus of claim 225, further comprising:
communicating said failure information.

227. The apparatus of claim 193, further comprising:
communicating said failure information.

228. The apparatus of claim 227, wherein said communicating comprises:
inserting said failure information into a frame.

229. The apparatus of claim 228, wherein said frame is a SONET frame and said inserting said failure information comprises:
inserting said zone identifier in a K1 byte of said SONET frame, and
inserting said action code in a K2 byte of said SONET frame.

230. The apparatus of claim 229, wherein said inserting is performed at a third node and the method further comprises:
communicating said failure information from said third node to a fourth node, wherein said SONET frame comprises at least one of an AIS or an RDI.

* * * * *